United States Patent
Baek et al.

(10) Patent No.: US 8,663,786 B2
(45) Date of Patent: Mar. 4, 2014

(54) POLYESTER FILM FOR OPTICAL APPLICATION

(75) Inventors: Sang-Hyun Baek, Gyeongsangbuk-do (KR); Han Soo Park, Gyeongsangnam-do (KR); Hong Hee Jung, Gyeongsangbuk-do (KR); Si Min Kim, Daegu (KR)

(73) Assignee: Kolon Industries, Inc., Gwacheon-Si (KR)

( * ) Notice: Subject to any disclaimer, the term of this patent is extended or adjusted under 35 U.S.C. 154(b) by 424 days.

(21) Appl. No.: 12/935,488

(22) PCT Filed: Mar. 31, 2009

(86) PCT No.: PCT/KR2009/001633
§ 371 (c)(1),
(2), (4) Date: Jan. 20, 2011

(87) PCT Pub. No.: WO2009/145445
PCT Pub. Date: Dec. 3, 2009

(65) Prior Publication Data
US 2011/0117339 A1    May 19, 2011

(30) Foreign Application Priority Data

Mar. 31, 2008 (KR) ........................ 10-2008-0030055
Mar. 31, 2008 (KR) ........................ 10-2008-0030058
Mar. 31, 2008 (KR) ........................ 10-2008-0030063

(51) Int. Cl.
*B32B 7/02* (2006.01)
*B32B 27/08* (2006.01)
*B32B 27/20* (2006.01)
*B32B 27/30* (2006.01)
*B32B 27/36* (2006.01)
*B32B 27/40* (2006.01)
*B32B 5/16* (2006.01)
*B05D 1/34* (2006.01)
*B29C 55/12* (2006.01)

(52) U.S. Cl.
USPC ........ 428/212; 428/331; 428/423.7; 428/483; 427/209; 427/407.1; 264/210.7

(58) Field of Classification Search
None
See application file for complete search history.

(56) References Cited

U.S. PATENT DOCUMENTS

| | | | |
|---|---|---|---|
| 6,921,580 B2 | 7/2005 | Akatsu et al. | |
| 7,005,176 B2 | 2/2006 | Tojo et al. | |
| 2006/0210768 A1 | 9/2006 | Masuda | |

FOREIGN PATENT DOCUMENTS

| | | |
|---|---|---|
| CN | 1512934 A | 7/2004 |
| CN | 1759137 A | 4/2006 |
| JP | 2-172143 A | 7/1990 |
| JP | 2-310048 A | 12/1990 |
| JP | 3-67626 A | 3/1991 |
| JP | 6-39154 A | 2/1994 |
| JP | 06-59108 A | 3/1994 |
| JP | 2002-098805 A | 4/2002 |
| JP | 2006-163378 A | 6/2006 |
| JP | 2006-208993 A | 8/2006 |
| JP | 2007-055217 A | 3/2007 |
| JP | 2007-148334 A | 6/2007 |
| KR | 10-2004-0073279 A | 8/2004 |
| KR | 10-2006-0056995 A | 5/2006 |

OTHER PUBLICATIONS

Wolf et al. "Plastics, Additives". Ullmann's Encyclopedia of Industrial Chemistry, (2000); pp. 619-671.*
"Polymers, Light & Science". DuPont, (2007); pp. 1-15.*
Dobrowolski, J.A. (eds. Bass et al.). "Optical Properties of Films and Coatings". Handbook of Optics: vol. 1, Fundamentals, Techniques & Design, (1995); pp. 42.3-42.130.*
Korean Office Action issued in corresponding KR Application No. 10-2008-0030055, dated Nov. 16, 2010.

* cited by examiner

*Primary Examiner* — Prashant J Khatri
(74) *Attorney, Agent, or Firm* — Sughrue Mion, PLLC

(57) ABSTRACT

Disclosed is a polyester film for optical applications, and more specifically to a polyester film having refractive index of 1.6 to 1.7 and a film having refractive index of 1.4 to 1.6 on both surfaces of the polyester film, wherein a thickness of each coating layer is 0.03 to 0.1 μm and total light transmittance of the entire film is 93% or more. The polyester film according to the embodiment has total light transmittance higher than the polyester film without the coating layer and is more suitable to use the polyester film for optical applications due to the excellent adhesive strength between the polyester film and layer for the post-processing working.

12 Claims, No Drawings

POLYESTER FILM FOR OPTICAL APPLICATION

CROSS REFERENCE TO RELATED APPLICATIONS

This application is a National Stage of International Application No. PCT/KR2009/001633 filed on Mar. 31, 2009, which claims priority from Korean Patent Application Nos. 10-2008-0030058, and 10-2008-0030063, filed on Mar. 31, 2008 the contents of all of which are incorporated herein by reference in their entirety.

TECHNICAL FIELD

The present invention relates to a polyester film having a both-sided coating layer used for optical application.

BACKGROUND ART

A film for optical application is commercialized later than a general polymer film that is used for packing materials, personal and household care products, vehicle, etc. However, as LCD-related technologies are developed and a study on a high functional film is advanced, the availability and demand of the film for optical application is being increased every day.

The film for optical film may include a viewing angle expanding film, an anti-reflective film, a compensation film, a luminous enhancement film, etc. A flim mainly used for the films for optical application is a polyester film.

The polyester film has excellent stability of physical property over a wide temperature range from a low temperature to a high temperature, excellent chemical resistance as compared to other polymer resins, good mechanical strength, good surface property, good uniformity of thickness, and excellent adaptability to various applications or process conditions, such that it may be applied to a condenser, a photographic film, a label, a pressure-sensitive tape, an ornamental laminate, a transfer tape, a polarizer, and a ceramic sheet, etc. Further, the demand of the polyester film is getting increased every day in line with the recently high-speed and automated trend.

The polyester film used in a field of a display has been used for a base film for a touch panel that is subjected to processes, such as hard coating processing through an offline coating, a film used for a PDP film, a base film used for a diffusion sheet included in a backlight unit, a prism lens sheet, a prism protective film, etc. a base film for an anti-reflective coating so as to prevent glare caused by light from the outside, etc.

The base film used in the field of the display has required several characteristics, such as processing and driving stability during processing, transparency, scratch resistant property, flatness, and light transmission. The reason why many requirements are needed is that the base film used in the field of the display should meet optical characteristics.

When flatness, which is one of characteristics required for the base film, is poor, tension is non-uniform in the manufacturing process of the base film to cause the slipping phenomenon, such that the scratch defect, etc., occur on the surface of the film and the applying thickness is non-uniform in a post-processing coating process, such that a partial coating defect occurs, thereby degrading the value of products.

When the scratch occurs on the base film, since problems, such as the occurrence of a black spot, which is an electrical defect, due to the non-uniform coating of the transparent conductive film on the scratched portion, the non-uniform coating in the post-processing processes such as the hard coating, etc. may occur, the scratch resistant property is needed. Further, the scratch causes the optical defects, thereby having a bad effect on the quality and yield of the products.

These properties required for the base film are required to increase the luminance improvement, thermal stability, processing property of the film. The deterioration of transparency, scratch resistant property, flatness, and total light transmittance deteriorates the luminance, reliability, and yield. The deterioration of luminance requires a brighter light source to obtain a required light amount and in order to obtain the high brightness light source, the cost of materials is increased and the high power consumption is required. As a result, the deterioration of luminance acts as a fatal defect factor to the base film used in the field of the display.

Therefore, in order to improve luminance, researches on the base film have been progressed. JP Patent No. 2006-208993 discloses a biaxially stretching polyester film comprised of a base film and a coating layer that is a light diffusion layer including binder and particles, JP Patent No. 2006-163378 discloses a polyester film having fine bubbles inside the film and prepared by laminating a coating layer including light stabilizer and antioxidant, which is stacked on the surface of the film, and JP Patent No. 1994-059108 discloses a polyester film having ruggedness formed on a base film and a base film whose both sides are stacked as a layer including light diffuser.

Further, a demand for the post-processing workability, in particular, the adhesive property with resin used for the post-processing has increased together with the requirements of the base film. When the adhesive property of the base film is low, in the post-processing process, the adhesive property between the base film and the post-processing resin is poor, such that the quality of products may be degraded.

In order to improve the adhesive property of the base film, JP-A-Hei 2-172143, JP-A-Hei 2-310048, and JP-A-Hei 3-67626 used a modified polyester resin based on graft modification as a coating resin, and JP A Hei 6-39154, and the like used a modified polyester resin together with a crosslinker. However, in performing different processing on both sides of the biaxially stretching polyester film, there is a problem in that one side has insufficient adhesive property.

DISCLOSURE

Technical Problem

The present invention is to provide a polyester film for optical application capable of improving adhesive strength with resin used for post-processing and improving total light transmittance by forming a coating layer on both sides of the polyester film for optical application.

Another object of the present invention is to provide a method of manufacturing a polyester film for optical application having properities such as improved total light transmittance and having a anti-static, a slip property, blocking ultraviolet rays, a waterproof, etc., in order to satisfy requirements of a film used in a field of a display as described above.

Technical Solution

The present invention relates to a polyester film for optical applications, and more particularly to a polyester film having refractive index of 1.6 to 1.7 and a film having coating layers having refractive index of 1.4 to 1.6 on both sides thereof, wherein a thickness of each coating layer is 0.03 to 0.1 μm and total light transmittance of the entire film is 93% or more. In the present invention, if the polyester film is a polyester film used for a general base film, any polyester film may be used without limitation, but it is preferable to used a film made of polyethyleneterephthalate (hereinafter, referred to as PET) or copolymer that uses ethyleneterephthalate as a main repeating unit.

The polyethyleneterephthalate film is obtained by polycondensing acidic component in which dicarboxylic acid is main component and glycol component in which alkylglycol is main component. As the main component of dicarboxylic acid, terephthalic acid, alkylester or phenylester thereof, and the like is mainly used, but some parts may be used by being substituted into, for example, bifunctional carboxylic acid, such as isophthalic acid, oxyethoxy benzoate, adipic acid, sebacic acid, 5-sodiumsulfoisophthalic acid, or ester forming derivatives thereof.

Further, as the glycol components, ethyleneglycol is mainly used, but some parts may be used by being substituted into, for example, propylene glycol, trimethyleneglycol, 1,4-cyclohexanediol, 1,4-cyclohexanedimethanol, 1,4-bisoxyethoxybenzene, bisphenol, polyoxyethyleneglycol. Moreover, if small content, glycol the monofunctional compound or the trifunctional compound may be used together.

The polyester film used in the present invention is a polyester film having refractive index of 1.6 to 1.7 and the coating layer having 1.4 to 1.6 may be formed on one side or both sides of the polyester film.

As another condition to improve the total light transmittance, it is preferable that the thickness of each coating layer is 0.03 to 0.1 μm. A method for increasing the total light transmittance uses a technology for reducing light amount reflected from the surface of the film. However, when the thickness of the coating layer is below 0.03 μm, the reduction of reflectivity is insignificant and when the thickness of the coating layer exceeds 0.1 μm, the reduction of transmittace may occurs by a constructive interference is performed in an area of a predetermined wavelength but an offset interference is performed in an area of a short wavelength. Moreover, the viscosity of the coating solution is increased to make the coating non-uniform, such that a generation of optical defects, a drying problem inside a tenter and the problem of the deterioration of winding property due to the deterioration of the slip property may occur. Also, as the thickness of the coating layer is getting thick, high cost is induced and in case recycling raw materials are prepared, quality deterioration may occur.

The coating layer is formed by applying a coating solution in an emulsion state including one or more binder resin selected from acrylate resin, urethane resin, and polyester resin and then drying it. In some cases, the coating solution is prepared by using a coating solution made of a mixture of hardener. It is preferable that the coating solution has solids of 2 to 10 wt % for a weight of the coating solution and a viscosity of 20 cps. If a concentration of solids is below 2 wt %, wet applying thickness should be increased in order to obtain a desired thickness of a coating layer and a lot of energy is required in order to dry the coating layer, such that the production cost may be increased, while if a concentration of solids exceeds 10 wt %, the viscosity is increased to 20 cps or more, such that the coating property may be deteriorated.

In one detailed example of the present invention, a polyurethane layer having refractive index of 1.50 to 1.55 may be coated on one side of the polyester film of the present invention and acrylic layer having refractive index of 1.40 to 1.48 may be coated on an opposite side thereto. At this time, it is preferable that a difference in refractive index between each coating layer and the polyester film is 0.05 or more, preferably 0.05 to 0.3. If a difference in refractive index between each coating layer and the polyester film is below 0.05, the light amount reflected from the side is increased to deteriorate the total light transmittance and when a final optical sheet is manufactured, the total light transmittance may be reduced. And, the larger the difference, the more the transmittance may be increased. Therefore, each coating layer may lead to improve the total light transmittance when the difference in refractive difference between each coating layer and the polyester film is 0.05 or more. When the difference in each coating layer and the polyester film is 0.05 or more, the reason why the total luminous transmittance is increased is that when light is incident on the film having the coating layer of the present invention, the light amount reflected from the side of the film is reduced due to the difference in refractive index of 0.05 or more and the transmitted light amount may be increased, thereby making it possible to suppress light loss. The suppression of light loss may be increased luminance after processing the diffusion film, the prism film, etc. that are final processing products.

The reason of forming the coating layer on the polyester film as the polyurethane layer and the acrylic layer is that the polyurethane layer and the acrylic layer has higher adhesive strength than the polyester film. When only the polyester film is used, since the adhesive strength between the post-processing resin and the PET film is poor in the post processing process. As a result, the case where the polyurethane layer and the acrylic layer is hetero-coated on both sides of the polyester film has higher adhesive strength than the where only the polyester film is coated.

When the coating solution for forming the polyurethane coating layer is a coating solution for forming the polyurethane resin having refractive index of 1.50 to 1.55, the composition of the coating solution is not limited. As the composition for forming the polyurethane resin, an ester or carbonate type forpolyol is used and aliphatic isocyanate for isocyanate is used, and the composition containing diol or diamine for chain extenders is used as the coatingsolution.

When the coating solution for forming the acrylic resin coating layer is a coating for forming the coating layer of acrylic resin having refractive index of 1.40 to 1.48, the composition of the coating solution is not limited. As the composition for forming the acrylic resin, the coating solution including a mixture of methyltetraacrylate, methacrylate, butylacrylate, acrylic acid is used. In the binder component used in the coatingsolution, $T_g$ is preferable to 20° C. to 100° C.

Further, as needed, any one or more component selected from anti-static agent, ultraviolet stabilizer, waterproof agent, slip agent, and thermal stabilizer may be included on at least one side of the coating layer.

The anti-static agent is used to mitigate the reduction of adhesive strength due to foreign materials in the post-processing process by preventing foreign materials such as dust from attaching or absorbing to the polyester film and if the anti-static agent may be used for the general polyester film, any anti-static agents may be used. As the example of the representatively used anti-static agent, quaternary ammonium salt such as butyloxyethyl hydroxylethyl ortho decyloxy ammonium salt, bishydroxydecylpropyl ammonium salt, hydroxybutyl dodecyloxybutyl ethylammonium, or metal particles such as salt, silver, gold, copper, aluminum, platinum, nickel, chromium, lead, cobalt, rhodium, ruthenium, tin, iridium, palladium, titanium, etc., are included, but the anti-static agent is not limited thereto.

The ultraviolet stabilizer absorbs ultraviolet and is used to prevent the decomposition of the coating layer by light and if the ultraviolet stabilizer may be used for the general polyester film, the use of the ultraviolet stabilizer is not limited. As the example of the representatively used ultraviolet stabilizer, ultraviolet absorber such as benzophenones, benzotriazoles, resorcinol monobenzoates, salicylates, hydroxyates, formamidines, etc., hindered amine-based ultraviolet stabilizer, imionester-based ultraviolet stablizer, etc. may be used, but the ultraviolet stablizer is not limited thereto.

The waterproof agent is used to prevent the deterioration of the slip property due to the side absorption of moisture according to the increase in the absorption of the polyester film but the use of the waterproof agent used for the general polyester film is not limited. As the representatively waterproof, the waterproof agent such as silicon compound and fluorine-containing compound such as perfluoroalkyl acrylate may be used.

The slip agent is used to increase the release property of the polyester film and the suppression of defect due to the post-processing process, as the example of the slip agent, colloidal silica, organic silicon polymer, or derivatives thereof, etc., may be used, but the slip agent used for the general polyester film is particularly not limited.

The thermal stabilizer may be used to obtain the sheet having the uniform thickness on a rotating and cooling roll at the time of processing the polyester film by an electrostatic applying method or may be used for the purpose of preventing oxidation at the time of manufacturing a wasted-plastic chip and thermal processing interval on the coating composition. The use of the thermal stabilizer such as phosphoric acid or phosphorus compound, etc., which are generally used, is particularly not limited.

Further, as the hardener, isocyanate, epoxy, melamine, carbodiimide, etc. may be for the coating layer.

Moreover, in the polyester film having the coating layers, any one or more of the coating layers may further include fluorescent whitening agent. If the coating layer includes the fluorescent whitening agent, it absorbs light of ultraviolet light (300 to 380 nm) to emit light to a short wavelength of visible rays, thereby making it possible to increase the total light transmittance. If the fluorescent whitening agent is used for the general polyester film that may lead to improve the total light transmittance, the use of the fluorescent whitening agent is not limited. For example, this effect may be obtained using Uvitex ERH, ERN-P, etc., of Ciba Gaigi.

The polyester film used for the present invention may include filler. A role of the filler included in the polyester film forms the ruggedness on the surface of the film to control friction coefficient between the polyester film and the coating layer and increases the hardness of the coating layer to make abrasion property good. Further, the organic filler may be used to increase the light diffusion property by the difference in refractive index between the polyester films and increase in the total luminous transmittance. If the filler is used for the general polyester film, the use of the filler is not limited. As the example of the filler, there may be anti-blocking inorganic particles such as precipitated calcium carbonate (CaO), silica ($SiO_2$) sol, barium sulfate ($BaSO_4$), sodium oxide ($NaO_2$), sodium sulfate ($Na_2SO_4$), kaolinite, kaolin, talc, etc., crosslink acrylic resin such as silicon resin, crosslinkdivinylbenzenepolymethacrylate, crosslinkpolymethacrylate, etc., organic particles such as crosslinkpolystyrene resin, benzoguanamine-formaldehyde resin, benzoguanamine-melamine-formaldehyde resin, melamine-formaldehyde resin, etc. Among those, since the silica sol, which is commercialized up to a nanosize, has excellent thermal stability, it may be used as filler. And, since it has better transparency and aqueous liquid dispersibility than any other filler, it is the most preferable to apply.

In one detailed example of the present invention the filler may have an average particle size of 0.1 to 10 μm. If the average particle size of the filler is below 0.1 μm, it does not give a help to driving stability and scratch resistant property and an effect of the injection of micro particles as well as causes the agglomeration of resin. If the average particle size of the filler exceeds 10 μm, since frauding protrusions are formed on the side of the film and the scratch occurrence may be caused due to the detachment of the frauding protrusion, it is preferable to use the filler having the average particle size of 0.1 to 10 μm.

The polyester film having the coating layer according to the above mentioned method has the total light transmittance of 93% or more. This may increase the total light transmittance for the polyester film on which the polyurethane layer and acrylic layer are not coated to 1% to 5% or more.

One detailed example of the present invention relates to a method of manufacturing a polyester film for optical application formed with a coating layer by an in-line coating scheme, more specifically, to a method method of manufacturing a polyester film for optical application including:

extruding a polyester sheet;

stretching the polyesters sheet to a machine direction (MD);

forming a coating layer by applying a coating solution including resin having refractive index of 1.4 to 1.6 on both sides stretching the polyester sheet formed with the coating layer in a width direction (Transverse Direction; TD) vertical to the machine direction at a stretching temperature or more in the machine direction; and heat setting.

The coating method used for the present invention uses an in-line coating scheme. When the coating solution is sprayed using a coating head during performing the coating, a void phenomenon occurs and if air is filled in the void, bubbles are generated. Since these bubbles cause defects after drying, it is very important to control process management and composition in order to suppress these bubbles.

The in-line coating scheme means a scheme that manufactures a coated film by sequentially performing the steps of stretching a base to the machine direction (MD) by coextrusion, applying the coating solution, performing stretching in the width direction (TD) vertical to the machine direction by tenter stretching at the stretching temperature or more in the machine direction, and heat setting.

The method of manufacturing a polyester film formed with the coating layer according to the present invention first extrudes the polyester sheet, crystallizes and solidifies it using a casting drum of 20 to 30° C., and then stretches it 2.5 to 4 times to the machine direction at a temperature of 80 to 120° C.

Thereafter, after the coating solution is coated on one side or both sides by a bar coating method, etc., it is preheated, dried, tenter-stretched at 100 to 150° C. that is higher temperature than the stretching temperature in the machine direction, and stretched 2.5 to 4.5 times to the width direction (TD) vertical to the machine direction.

Then, it is thermally fixed at 210 to 240° C. and cooled at a normal temperature, thereby making it possible to obtain a polyester film coated with other materials having different refractive index from the polyester film In the polyester film formed with the coating layer manufactured according to the manufacturing method of the present invention, a coating layer has an enough thickness of 0.03 to 0.1 μm, the entire film has total light transmittance of 93% or more, and total light transmittance is increased higher than 3% as compared to the polyester film without the coating layer.

Advantageous Effects

The polyester film according to the present invention has the total light transmittance of 93% or more and may achieve the improvement of the total light transmittance higher by 1 to 5% than the polyester film without the coating layer. Further, the polyester film according to the present invention has the coating layer to make the adhesive strength between the polyester film and the post-processing working layer excellent, such that it is more suitable to use as the polyester film for optical applications.

Further, the manufacturing method according to the present invention may continuously form the coating layer by the in-line coating method on the polyester film, such that the polyester film may mass-produced.

Best Mode

Hereinafter, the present invention will be described with reference to embodiments and comparative examples, but the present invention is not limited thereto.

A method for measuring physical properties shown in the following embodiments and comparative examples is as follows.

1) Measurement of average particle size of particles: the average particle size was measured using a diffraction particle size measurer (Beckman, Coulter LS13 320).

2) Measurement of total luminous transmittance of film: it was measured using a total luminous transmittance measurer (Nippon Denshoku 300A).

3) Haze measurement: the haze measurement was measured using ASTM D1003 and was calculated by the following equation using Nippon Denshoku 300A.

Haze (%)=(total scattering light/total transmitting light)×100

4) Measurement of refractive index of film: It was measured at normal temperature using a refractive index measurer ABE refractive system (ATAGO).

Example 1

Manufacture of Acrylic Coating Solution

A coating solution 1 having solids of a concentration of 4.35 wt % and a viscosity of 12 cps was prepared by adding acrylic binder of 4 g having refractive index of 1.44, silicon-based wetting agent (polyester siloxane copolymer available from TEGO Co.) of 0.1 g, and 200 nm colloid silica particle of 0.1 g, melamine-based hardener (DIC Co.) of 0.15 g into water (solvent) and then agitating for 3 hours.

Manufacturing of Urethane-Based Coating Solution

A coating solution 2 having solids of a concentration of 4.35 wt % and a viscosity of 12 cps was prepared by adding urethane-based binder of 4 g having refractive index of 1.52, silicon-based wetting agent (polyester siloxane copolymer available from Dow Corning Co.) of 0.1 g, 200 nm colloid silica particle of 0.1 g, and carbodiimides of 0.15 g into water (solvent) and then agitating for 3 hours.

Manufacture of Both-Sided Hetero Coating Base Film

In a polymerization step, a polyethyleneterephthalate chip obtained by polymerizing a master arrangement to which silica of 500 ppm having an average particle size (Coulter Counter method) of 1.4 μm is added and a polyethyleneterephthalate chip to which particles are not added were mixed to include particles of 50 ppm in the final film.

The mixed polyethyleneterephthalate chip (CHIP) is put in a drier and is dried for 8 hours at 180° C. to lower the moisture content in the chip to 100 ppm or less.

The polyethyleneterephthalate chip from which moisture is removed is put in an extruder, fusion-extruded, and then rapidly cooled and solidified by a casting drum to obtain polyethyleneterephthalate having a thickness of 2000 μm.

A both-sided coating biaxially stretched film of 188 μm was manufactured by stretching each of the coating solution 1 and the coating solution 2 prepared by stretching the obtained polyethyleneterephthalate sheet 3.5 times in a machine direction (MD) at a temperature of Tg or more, that is, a temperature of 110° C., coating them on each side of the sheet, respectively, by a bar coating method, being subjected to the preheating and drying at 140° C., which is a temperature higher than the stretching temperature in the machine direction to further stretch it 3.5 times in a transverse direction (TD), being subjected to the heat-setting at a temperature of 235° C. in a heat-setting zone of more than 5 stage tenter to be prepareed to the film, relaxing the film by 10% in the machine direction and the transverse direction at a temperature of 200° C. or less in the cooling zone, and heat-setting the film. The physical properties of the obtained base film are shown in Table 1.

Example 2

Manufacture of Acrylic Coating Solution

A coating solution 1 having solids of a concentration of 4.35 wt % and a viscosity of 12 cps was prepared by adding acrylic binder of 4 g having refractive index of 1.44, silicon-based wetting agent (polyester siloxane copolymer available from TEGO Co.) of 0.1 g, and 200 nm colloid silica particle of 0.1 g, melamine-based hardener (DIC Co.) of 0.15 g into water (solvent) and then agitating for 3 hours.

Manufacturing of Urethane-Based Coating Liquid

A coating solution 3 having solids of a concentration of 4.35 wt % and a viscosity of 12 cps was prepared by adding urethane-based binder of 4 g having refractive index of 1.50, silicon-based wetting agent (polyester siloxane copolymer available from Dow Corning Co.) of 0.1 g, 200 nm colloid silica particle of 0.1 g, and carbodiimides as hardener of 0.15 g into water (solvent) and then agitating for 3 hours.

Manufacture of Both-Sided Hetero Coating Base Film

In a polymerization step, a polyethyleneterephthalate chip obtained by polymerizing a master arrangement to which silica of 500 ppm having an average particle size (Coulter Counter method) of 1.4 μm is added and a polyethyleneterephthalate chip to which particles are not added were mixed to include particles of 50 ppm in the final film.

The mixed polyethyleneterephthalate chip (CHIP) is put in a drier and is dried for 8 hours at 180° C. to lower the moisture content in the chip to 100 ppm or less.

The polyethyleneterephthalate chip from which moisture is removed is put in an extruder, fusion-extruded, and then rapidly cooled and solidified by a casting drum to obtain polyethyleneterephthalate having a thickness of 2000 μm.

A both-sided coating biaxially stretched film of 188 μm was manufactured by stretching each of the coating solution 1 and the coating solution 3 prepared by stretching the obtained polyethyleneterephthalate sheet 3.5 times in a machine direction (MD) at a temperature of Tg or more, that is, a temperature of 110° C., coating them on each side of the sheet, respectively, by a bar coating method, being subjected to the preheating and drying at 140° C., which is a temperature higher than the stretching temperature in the machine direction to further stretch it 3.5 times in a transverse direction (TD), being subjected to the heat-setting at a temperature of 235° C. in a heat-setting zone of more than 5 stage tenter to be prepareed to the film, relaxing the film by 10% in the machine direction and the transverse direction at a temperature of 200° C. or less in the cooling zone, and heat-setting the film. The physical properties of the obtained base film are shown in Table 1.

Example 3

Manufacture of Acrylic Coating Solution

A coating solution 1 having solids of a concentration of 4.35 wt % and a viscosity of 12 cps was prepared by adding acrylic binder of 4 g having refractive index of 1.44, silicon-based wetting agent (polyester siloxane copolymer available from TEGO Co.) of 0.1 g, and 200 nm colloid silica particle of 0.1 g, melamine-based hardener (DIC Co.) of 0.15 g into water (solvent) and then agitating for 3 hours.

Manufacturing of Urethane-Based Coating Solution

A coating solution 2 having solids of a concentration of 4.35 wt % and a viscosity of 12 cps was prepared by adding urethane-based binder of 4 g having refractive index of 1.52, silicon-based wetting agent (polyester siloxane copolymer available from Dow Corning Co.) of 0.1 g, 200 nm colloid silica particle of 0.1 g, and carbodiimides as hardener of 0.15 g into water (solvent) and then agitating for 3 hours.

Manufacture of Both-Sided Hetero Coating Base Film

In a polymerization step, a polyethyleneterephthalate chip obtained by polymerizing a master arrangement to which silica of 500 ppm having an average particle size (Coulter Counter method) of 1.4 μm is added and a polyethyleneterephthalate chip to which particles are not added were mixed to include particles of 50 ppm in the final film.

The mixed polyethyleneterephthalate chip (CHIP) is put in a drier and is dried for 8 hours at 180° C. to lower the moisture content in the chip to 100 ppm or less.

The polyethyleneterephthalate chip from which moisture is removed is put in an extruder, fusion-extruded, and then rapidly cooled and solidified by a casting drum to obtain polyethyleneterephthalate having a thickness of 2000 μm.

A both-sided coating biaxially stretching film of 188 μm was manufactured by stretching each of the coating liquid 1 and the coating liquid 2 prepared by stretching the obtained polyethyleneterephthalate sheet 3.5 times in a machine direction (MD) at a temperature of Tg or more, that is, a temperature of 110° C., coating them on each side of the sheet, respectively, by a bar coating method, being subjected to the preheating and drying at 140° C., which is a temperature higher than the stretching temperature in the machine direction to further stretch it 3.5 times in a transverse direction (TD), being subjected to the heat-setting at a temperature of 235° C. in a heat-setting zone of more than 5 stage tenter, to be prepareed to the film, relaxing the film by 10% in the machine direction and the transverse direction at a temperature of 200° C. or less in the cooling zone, and heat-setting the film. The physical property of the obtained base film is shown in Table 1.

Example 4

Manufacturing of Both-Sided Polyester Film

A coating solution having solids of a concentration of 4.35 wt % and a viscosity of 12 cps was prepared by adding acrylic binder of 4 g having refractive index of 1.44, silicon-based wetting agent (polyester siloxane copolymer available from TEGO Co.) of 0.1 g, and 200 nm colloid silica particle of 0.1 g, melamine-based hardener (DIC Co.) of 0.15 g into water (solvent) and then agitating for 3 hours.

In a polymerization step, a polyethyleneterephthalate chip obtained by polymerizing a master arrangement to which silica of 500 ppm having an average particle size (Coulter Counter method) of 1.4 μm is added and a polyethyleneterephthalate chip to which particles are not added were mixed to include particles of 50 ppm in the final film.

The mixed polyethyleneterephthalate chip (CHIP) is put in a drier and is dried for 8 hours at 180° C. to lower the moisture content in the chip to 100 ppm or less.

The polyethyleneterephthalate chip from which moisture is removed is put in an extruder, fusion-extruded, and then rapidly cooled and solidified by a casting drum to obtain polyethyleneterephthalate having a thickness of 2000 μm.

A both-sided coating biaxially stretched film of 188 μm was manufactured by stretching each of the coating solution prepared by stretching the obtained polyethyleneterephthalate sheet 3.5 times in a machine direction at a temperature of Tg or more, that is, a temperature of 110° C., coating it on both sides of the sheet by a bar coating method, being subjected to the preheating and drying at 140° C., which is a temperature higher than the stretching temperature in the machine direction to further stretch it 3.5 times in a transverse direction (TD), being subjected to the heat-setting at a temperature of 235° C. in a heat-setting zone of more than 5 stage tenter, to be prepareed to the film, after relaxing the film by 10% in the machine direction and the transverse direction at a temperature of 200° C. or less in the cooling zone and heat-setting the film. The physical properties of the obtained base film are shown in Table 1.

Comparative Examples 1

Manufacture of Polyester Film Without Coating Layer

In a polymerization step, a polyethyleneterephthalate chip obtained by polymerizing a master arrangement to which silica of 500 ppm having an average particle size (Coulter Counter method) of 1.4 μm is added and a polyethyleneterephthalate chip to which particles are not added were mixed to include particles of 50 ppm in the final film.

The mixed polyethyleneterephthalate chip (CHIP) is put in a drier and is dried for 8 hours at 180° C. to lower the moisture content in the chip to 100 ppm or less.

The polyethyleneterephthalate chip from which moisture is removed is put in an extruder, fusion-extruded, and then rapidly cooled and solidified by a casting drum to obtain polyethyleneterephthalate having a thickness of 2000 μm.

The biaxially stretched film of 188 μm was manufactured by stretching the obtained polyethyleneterephthalate sheet 3.5 times to a machine direction (MD) at a temperature of Tg or more, that is, a temperature of 110° C., cooling it at normal temperature, being subjected to the preheating and drying at 140° C., which is a temperature higher than the stretching temperature in the machine direction to further stretch it 3.5 times to a transverse direction, being subjected to the heat-setting at a temperature of 235° C. in a heat-setting zone of more than 5 stage tenter to be prepareed to the film, relaxing the film by 10% in the machine direction and the transverse direction at a temperature of 200° C. or less in the cooling zone, and heat-setting the film. The physical properties of the obtained base film are shown in Table 1.

Comparative Example 2

Manufacture of One-Sided Coating Polyester Film

A coating solution having solids of a concentration of 4.35 wt % and a viscosity of 12 cps was prepared by adding acrylic binder of 4 g having refractive index of 1.44, silicon-based wetting agent (polyester siloxane copolymer available from TEGO Co.) of 0.1 g, and 200 nm colloid silica particle of 0.1 g, melamine-based hardener (DIC Co.) of 0.15 g into water (solvent) and then agitating for 3 hours.

In a polymerization step, a polyethyleneterephthalate chip obtained by polymerizing a master arrangement to which silica of 500 ppm having an average particle size (Coulter Counter method) of 1.4 μm is added and a polyethyleneterephthalate chip to which particles are not added were mixed to include particles of 50 ppm in the final film.

The mixed polyethyleneterephthalate chip (CHIP) is put in a drier and is dried for 8 hours at 180° C. to lower the moisture content in the chip to 100 ppm or less.

The polyethyleneterephthalate chip from which moisture is removed is put in an extruder, fusion-extruded, and then rapidly cooled and solidified by a casting drum to obtain polyethyleneterephthalate having a thickness of 2000 μm.

A one-sided coating biaxially stretched film of 188 μm was manufactured by stretching each of the coating liquids prepared by stretching the obtained polyethyleneterephthalate sheet 3.5 times in a machine direction at a temperature of Tg or more, that is, a temperature of 110° C., coating it on one sideof the sheet by a bar coating method, being subjected to the preheating and drying at 140° C., which is a temperature higher than the stretching temperature in the machine direction to further stretch it 3.5 times in a transverse direction (TD), being subjected to the heat-setting at a temperature of 235° C. in a heat-setting zone of more than 5 stage tenter tenter to be prepareed to the film, relaxing the film by 10% in the machine direction and the transverse direction at a temperature of 200° C. or less in the cooling zone, and heat-setting the film. The physical property of the obtained base film is shown in Table 1.

Comparative Examples 3

Manufacture of Acrylic Coating Solution

A coating solution 1 having solids of a concentration of 4.35 wt % and a viscosity of 12 cps was prepared by adding acrylic binder of 4 g having refractive index of 1.44, silicon-based wetting agent (polyester siloxane copolymer available from TEGO Co.) of 0.1 g, and 200 nm colloid silica particle of 0.1 g, melamine-based hardener (DIC Co.) of 0.15 g into water (solvent) and then agitating for 3 hours.

Manufacturing of Urethane-Based Coating Solution

A coating solution 4 having solids of a concentration of 4.35 wt % and a viscosity of 12 cps was prepared by adding urethane-based binder of 4 g having refractive index of 1.48, silicon-based wetting agent (polyester siloxane copolymer available from Dow Corning Co.) of 0.1 g, 200 nm colloid silica particle of 0.1 g, and carbodiimides as hardener of 0.15 g into water (solvent) and then agitating for 3 hours.

Manufacture of Both-Sided Hetero Coating Base Film

In a polymerization step, a polyethyleneterephthalate chip obtained by polymerizing a master arrangement to which silica of 500 ppm having an average particle size (Coulter Counter method) of 1.4 μm is added and a polyethyleneterephthalate chip to which particles are not added were mixed to include particles of 50 ppm in the final film.

The mixed polyethyleneterephthalate chip (CHIP) is put in a drier and is dried for 8 hours at 180° C. to lower the moisture content in the chip to 100 ppm or less.

The polyethyleneterephthalate chip from which moisture is removed is put in an extruder, fusion-extruded, and then rapidly cooled and solidified by a casting drum to obtain polyethyleneterephthalate having a thickness of 2000 μm.

A both-sided coated biaxially stretched film of 188 μm was manufactured by stretching each of the coating solution 1 and the coating solution 2 prepared by stretching the obtained polyethyleneterephthalate sheet 3.5 times in a machine direction (MD) at a temperature of Tg or more, that is, a temperature of 110° C., coating it on each surface of the sheet, respectively by a bar coating method, being subjected to the preheating and drying at 140° C., which is a temperature higher than the stretching temperature in the machine direction to further stretch it 3.5 times in a transverse direction (TD), being subjected to the heat-setting at a temperature of 235° C. in a heat-setting zone of more than 5 stage tenter tenter to be prepareed to the film, relaxing the film by 10% in the machine direction and the transverse direction at a temperature of 200° C. or less in the cooling zone, and heat-setting the film. The physical property of the obtained base film is shown in Table 1.

TABLE 1

Compare physical properties of polyester film

| Item | | Refractive Index | Thickness (μm) | Transmittancce (%) | Haze (%) |
|---|---|---|---|---|---|
| Example 1 | Acrylic coating layer | 1.44 | 0.05 | 93.7 | 1.3 |
| Example 2 | PET layer | 1.64 | 188 | | |
| | Polyurethane coating layer | 1.52 | 0.05 | | |
| | Polyurethane coating layer | 1.50 | 0.03 | 93.1 | 1.2 |
| | PET layer | 1.65 | 188 | | |
| Example 2 | Acrylic coating layer | 1.44 | 0.05 | | |
| | Polyurethane coating layer | 1.52 | 0.03 | 93.5 | 1.2 |
| | PET layer | 1.65 | 188 | | |
| Example 3 | Acrylic coating layer | 1.44 | 0.05 | | |
| | Acrylic coating layer | 1.44 | 0.05 | 94.6 | 1.3 |
| | PET layer | 1.64 | 188 | | |
| Example 4 | Acrylic coating layer | 1.44 | 0.05 | | |
| Comparative example 1 | PET layer | 1.64 | 188 | 88.9 | 1.1 |
| Comparative example 2 | Acrylic coating layer | 1.44 | 0.05 | 91.3 | 1.2 |
| | PET layer | 1.64 | 188 | | |
| Comparative example 3 | Acrylic coating layer | 1.44 | 0.02 | 90.8 | 1.4 |
| | PET layer | 1.64 | 188 | | |
| | Polyurethane coating layer | 1.48 | 0.03 | | |

The present application contains subject matter related to Korean Patent Application No. 2008-30055, 2008-30058, 2008-30063, filed in the Korean Intellectual Property Office on Mar. 31, 2008, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

INDUSTRIAL APPLICABILITY

The polyester film according to the present invention has the total light transmittance of 93% or more and may achieve the improvement of the total light transmittance higher by 1 to 5% than the polyester film without the coating layer. Further, the polyester film according to the present invention has the coating layer to make the adhesive strength between the polyester film and the post-processing working layer excellent, such that it is more suitable to use as the polyester film for optical applications.

Further, the manufacturing method according to the present invention may continuously form the coating layer by the in-line coating method on the polyester film, such that the polyester film may mass-produced.

The invention claimed is:

1. A coated polyester film for optical applications comprising
    a polyester film having refractive index of 1.6 to 1.7;
    a first coating layer directly formed on one side of the polyester film and having refractive index 1.5 to 1.55; and
    a second coating layer directly formed on the opposite side of the polyester film and having refractive index 1.4 to 1.48,
    wherein a difference in refractive index between each coating layer and the polyester film is 0.05 or more,
    a thickness of each coating layer is 0.03 to 0.1 μm, total light transmittance of the entire coated polyester film is 93% or more, and
    the first coating layer is formed of a polyurethane resin and the second coating layer is formed of an acrylic resin.

2. The polyester film for optical applications according to claim 1, wherein, any one of the coating layers further comprises components selected from an anti-static agent, ultraviolet stabilizer, waterproof agent, slip agent, and thermal stabilizer.

3. The polyester film for optical applications according to claim 1, wherein any one of the coating layers further comprises a fluorescent whitening agent.

4. The polyester film for optical applications according to claim 1, wherein the polyester film includes a filler.

5. The polyester film for optical applications according to claim 4, wherein the filler is silica having an average particle size of 0.1 to 10 μm.

6. The polyester film for optical applications according to claim 1, wherein the polyester film is a polyethyleneterephthalate film.

7. A method of manufacturing a coated polyester film, said method comprising:
    extruding a polyester sheet;
    stretching the polyester sheet to a machine direction (MD) wherein the refractive index of the polyester sheet is 1.6 to 1.7;
    forming a first coating layer by directly applying a coating liquid containing a polyurethane resin on one side of the polyester sheet;
    forming a second coating layer by directly applying a coating liquid containing an acrylic resin on the opposite side of the polyester sheet;
    stretching thus both-side coated polyester sheet in a width direction (Transverse Direction; TD) vertical to the machine direction at a stretching temperature or more in the machine direction; and
    heat setting the stretched coated polyester sheet,
    wherein the first coating layer has refractive index of 1.5-1.55,
    wherein the second coating layer has a refractive index of 1.4-1.48,
    wherein a difference in refractive index between each coating layer and the polyester sheet is 0.05 or more,
    a thickness of each coating layer is 0.03 to 0.1 μm, total light transmittance of the entire coated polyester film is 93% or more.

8. The method of manufacturing a polyester film for optical applications according to claim 7, wherein said refractive index of the polyester film without the coating layer is 1.6 to 1.7.

9. The method of manufacturing a polyester film for optical applications according to claim 7, wherein said coating solution further includes any one component selected from an anti-static agent, ultraviolet stabilizer, waterproof agent, slip agent, and thermal stabilizer.

10. The method of manufacturing a polyester film for optical applications according to claim 7, wherein said coating solution further include a fluorescent whitening agent.

11. The method of manufacturing a polyester film for optical applications according to claim 7, wherein said polyester sheet includes a filler.

12. The method of manufacturing a polyester film for optical applications according to claim 11, wherein said filler is silica having an average particle size of 0.1 to 10 μm.

* * * * *